United States Patent

[11] 3,591,122

[72] Inventor Stephen R. Mehaffie
 3876 Herford Trail, Dayton, Ohio 45449
[21] Appl. No. 862,693
[22] Filed Oct. 1, 1969
[45] Patented July 6, 1971

[54] HYDROSHORING
 5 Claims, 6 Drawing Figs.
[52] U.S. Cl. .................................................. 248/350, 267/122
[51] Int. Cl. .................................................... F16m 13/00
[50] Field of Search .......................................... 248/350, 346, 188.3, 188.2, 400; 108/51; 267/122, 130; 92/250, 98 RD

[56] References Cited
 UNITED STATES PATENTS
2,846,983  8/1958  Otto .............................. 267/122

| | | | |
|---|---|---|---|
| 2,908,472 | 10/1959 | McDonald | 248/346 |
| 3,195,890 | 7/1965 | Salls | 248/350 X |
| 3,343,775 | 9/1967 | Stephenson | 248/400 |
| 3,351,027 | 11/1967 | Ellard | 108/51 |

*Primary Examiner*—Chancellor E. Harris
*Attorneys*—Harry A. Herbert, Jr. and Arthur R. Parker ABSTRACT: A cargo aircraft pallet having a bottom pressure plate, a sealed compartment filled with hydraulic oil and encompassing the bottom plate, and a cargo-supporting platform floating on top, and thereby supported by the hydraulic oil. The floating platform is movable, under a cargo load, relative to the bottom plate to thereby form a pressure that is evenly transmitted throughout the hydraulic oil over the relatively wide area of the bottom plate to thereby substantially reduce the force applied to the floor of the aircraft.

PATENTED JUL 6 1971

INVENTOR.
STEPHEN R. MEHAFFIE
BY *Harry A. Herbert Jr.*
ATTORNEY

*Arthur R. Parker*
AGENT

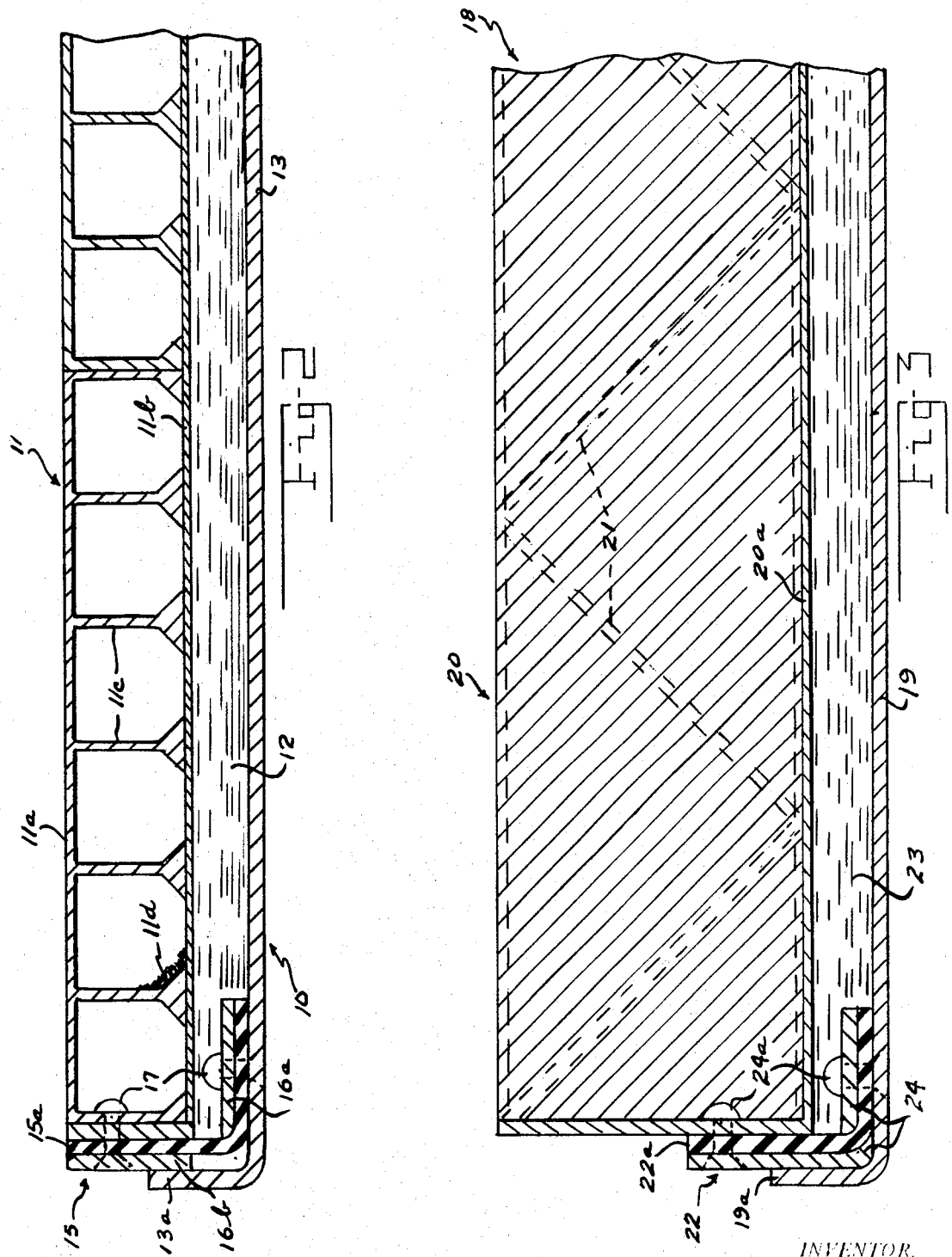

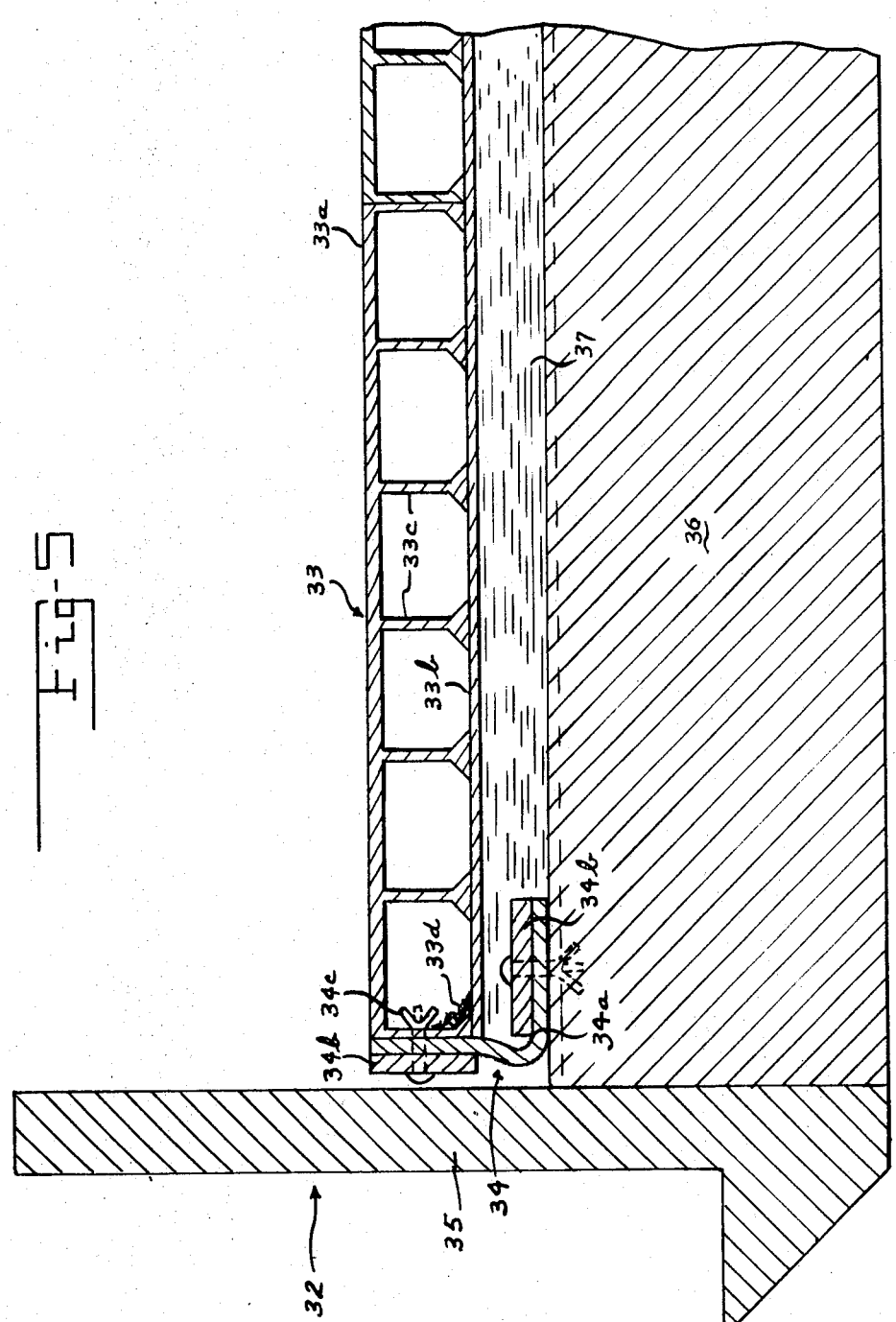

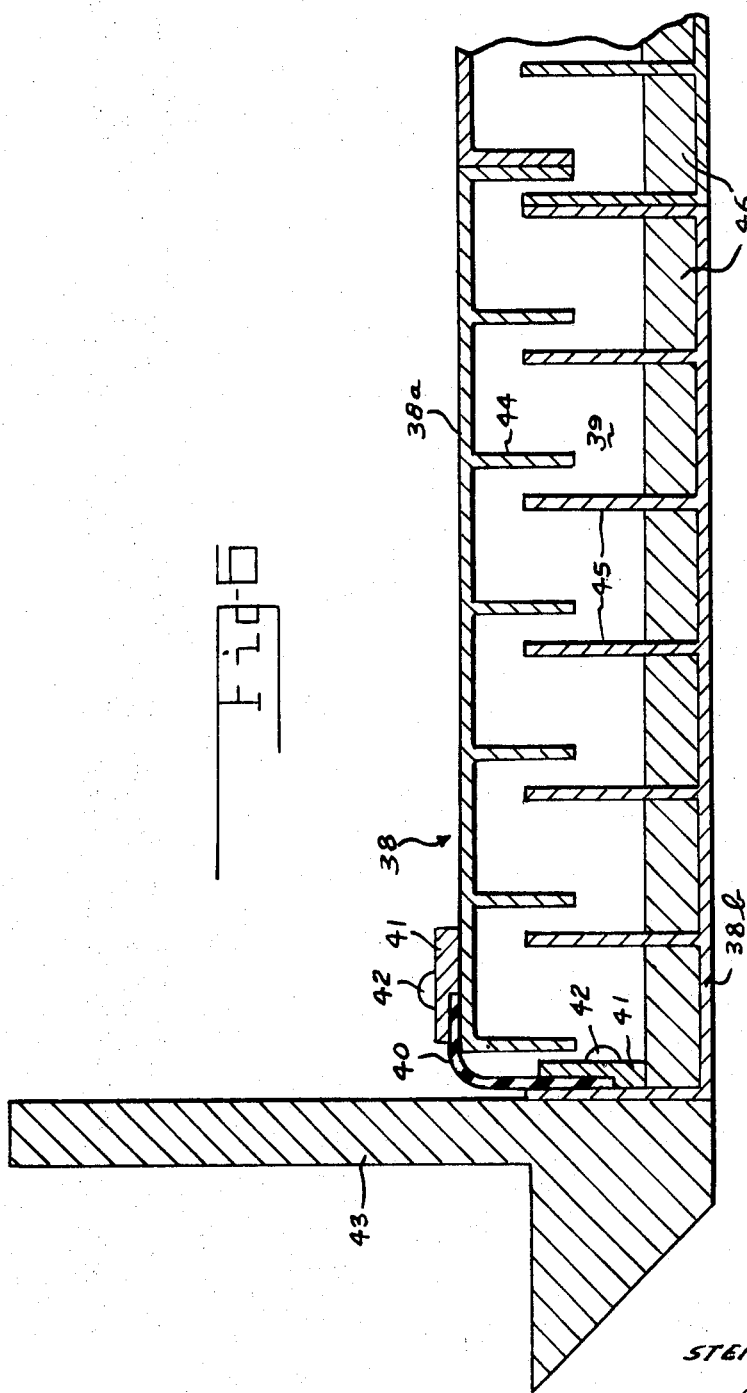

3,591,122

HYDROSHORING

BACKGROUND OF THE INVENTION

This invention relates generally to the field of technology of cargo aircraft pallets.

In previous cargo pallets, wood shoring is used to support the cargo and to protect the sides and floor of the aircraft. However, such wood shoring is relatively heavy and, in addition, certain loads are too heavy to be carried by the aircraft since the floor loading criteria thereof would be violated. The latter problem is solved or, at least, substantially alleviated by the unique hydroshoring system of the present invention, as will be hereinafter further described in the following summary and detailed description thereof.

SUMMARY OF THE INVENTION

The hydroshoring system of the present invention consists briefly in a novel thin, metal pad that includes a main supporting, bottom pressure plate; a floating floor; and a sealed, contained compartment or chamber filled with hydraulic fluid supported on the bottom plate and, in turn, supporting the floating floor. Thus, any load placed on the floating floor creates a fluid pressure within the hydraulic fluid contained in the sealed compartment or chamber, which pressure is uniformly distributed throughout and acts with a unique, lowered force over the entire area of the bottom pressure plate to thereby permit the air transport of much greater cargo loads than was previously possible with the normally used wood shoring methods. The floating floor is made in the form of a structural-type member which provides greater supporting strength to unusually dense loads to be carried thereby.

Other advantages, as well as objects of the invention, will become readily apparent from the following disclosure and accompanying drawings, in which:

BRIEF DESCRIPTION OF THE DRAWINGS

FIG. 2 is a cross-sectional view, partly broken away, taken about on line 2–2 of FIG. 1, generally showing more details of the partially overlapping relation between the bottom and top, floating platform plates representing the inventive hydroshoring system and, in particular, illustrating details of a clamp seal mechanism utilized in a relatively light-duty form of the invention;

FIG. 3 is a second, cross-sectional view, partly broken away, of a modified, heavy-duty type of the inventive hydroshoring system of FIG. 2;

FIG. 5 is still another partly broken away and cross-sectional view, somewhat similar to that of FIG. 2, but showing the inventive hydroshoring system incorporated in one type of aircraft cargo pallet;

FIG. 6 is a further cross-sectional view, partly broken away, of a modified form of the inventive hydroshoring system applied to another type of cargo pallet.

DESCRIPTION OF THE PREFERRED EMBODIMENT

Figure 1:
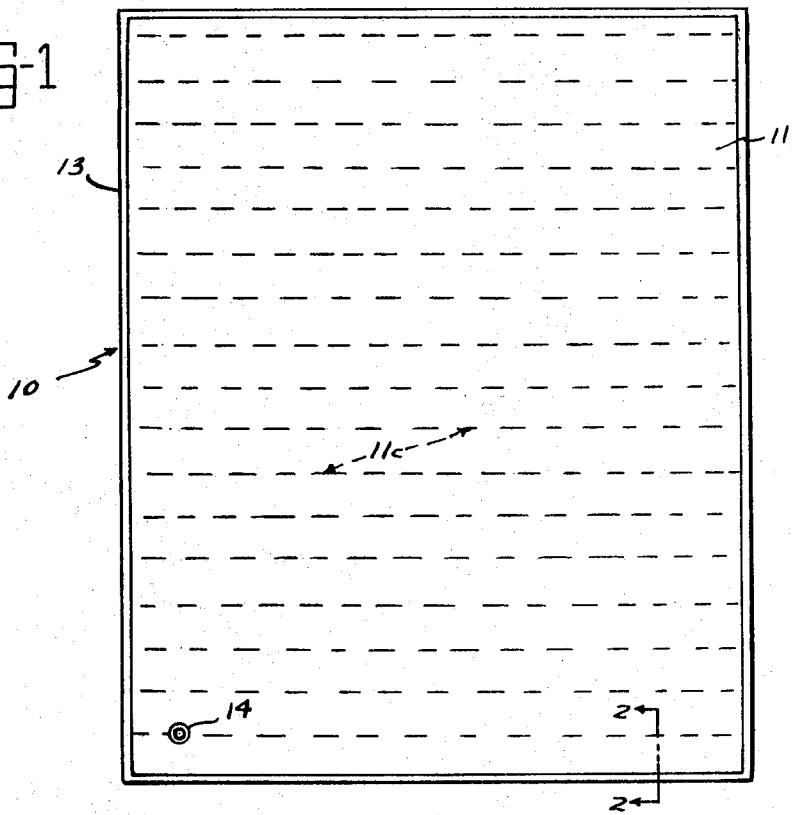
FIG. 1 represents a somewhat schematic plan view of the improved, hydroshoring system of present invention, illustrating the bottom pressure plate thereof as overlapping somewhat the unique floating floor member of the invention, and further being integrally formed with both side and end rail portions.

Referring to the drawing and, in particular, to FIGS. 1 and 2 thereof, the improved, hydroshoring system of the present invention is indicated generally at 10 as consisting basically of a rectangular-shaped pad or platformlike arrangement including a floating structural floor at 11, a sealed, contained, fluid compartment or chamber at 12 (FIG. 2), and a bottom pressure plate 13. A filler opening for filling compartment 12 with hydraulic oil is depicted at 14 in FIG. 1.

The aforementioned floating floor 11 is made into a structural-type member in order to prevent local yielding under load, puncture of the sealed compartment or chamber, and/or any deflection thereof as a result of contact occurring between the said floor 11 and the bottom pressure plate 13. For this purpose, floor 11 is specifically fabricated, as is particularly seen in FIG. 2, to include both an upper floor plate portion at 11a, and a lower floor plate portion at 11b held in spaced relation therefrom by means of a plurality of spaced-apart, supporting ribs, indicated at 11c as being interconnected therebetween. These ribs 11c, which, as is schematically indicated by the dotted lines in FIG. 1, extend across the entire width of the inventive hydroshoring system, may be integrally formed at the upper ends thereof with the upper floor plate portion 11a. At their lower ends, the aforesaid interconnecting ribs 11c may be tack-welded to the lower floor plate portion 11b, as is indicated, for example, at the reference numeral 11d. As seen in the aforesaid FIG. 2, upper floor plate portion 11a is relatively thicker than lower plate portion 11b in order to thereby provide an upper or top floor surface that is made rugged enough to withstand the wear and tear of relatively heavy and/or dense cargo loads.

The foregoing hydroshoring-structural floating floor 11 rests on, and is totally supported by the hydraulic oil filled in the aforementioned compartment or chamber 12. Since the floating floor 11 has no other structural support, any forces applied normal to the top surface thereof, as by means of a cargo load being emplaced thereon, is transformed into pressure in the said hydraulic oil in compartment or chamber 12. Therefore, with the above-described arrangement, the inventive hydroshoring system 10 acts as a relatively enlarged hydraulic cylinder, and any relatively heavy and/or dense load, for example, placed on top of the floating structural floor 11 automatically forms a pressure within the said hydraulic oil, as indicated hereinbefore, which pressure is evenly distributed throughout the said compartment or chamber 11. Thus, any force of a relatively concentrated cargo load becomes operative, by way of the hydraulic oil in the compartment or chamber 11, over the entire, exposed and relatively wide area of the bottom pressure plate 13. This application of the initially relatively large force occurring at the point of the placement of a relatively dense cargo load on the floating floor 11, and its subsequent formation of an evenly distributed pressure in the hydraulic oil, results in a considerably reduced force being applied across the surface of the bottom pressure plate 13 and to the floor of the aircraft in which it is to be used. In this novel and simplified manner, a considerably larger and denser cargo of substantially increased weight may be loaded onto the floating floor 11 without the floorload limits for the particular aircraft having been exceeded.

The previously described compartment or chamber 12 may be sealed as by means of a clamp-seal means indicated generally at 15 in FIG. 2. Said clamp-seal means may include a seal member as at 15a, and a pair of clamp members at 16a and 16b for clamping opposite side portions of said seal member 15a in respective sealing contact between the aforementioned floating floor 11 and the bottom pressure plate 13, as is clearly illustrated in the aforesaid FIG. 2. Clamp members 16a, 16b may, in turn, be retained or locked in their seal member-clamping position by means of appropriate fasteners, such as is indicated at 17. The latter may represent rivets, locking bolts and nuts, or other means.

The seal member 15a may consist of a one-piece rubber compound, or some other suitable compound such as neoprene. In either event, the aforesaid sealing member 15a, as well as other sealing means to be hereinafter described in connection with modified forms of the invention, may be designed for a working pressure of 10 p.s.i.g., and to offer a minimum resistance only to compressive forces. Ideally, said seal member 15a should offer no resistance to the movement of the floating floor 11 when the latter is supporting a load.

Moreover, it should also preferably incorporate a tensile strength adequate only to resist the weight of the floating floor, as at 11 in FIG. 2, plus the weight of the hydraulic oil in the pressure compartment or chamber 12, which condition would occur only when the inventive hydroshoring system 10 would be in the inverted position.

In the illustration of FIGS. 1 and 2, which represents a light-duty form of the invention, the bottom pressure plate 13 may consist of a stamped pan configuration having upright or vertical side portions, indicated at 13a in FIG. 2, which extend around all four sides of the hydroshoring system 10. As seen clearly in the aforesaid FIG. 2, vertical side portions 13a are made to overlap, but not extend beyond the floating floor 11. With such an overlapping relation, lateral movement of said floating floor 11 is prevented. In this regard, the design of the said bottom pressure plate 13 is such that a predetermined amount of flexure is built into the seal member 15a, which action is imperative to the operation of the inventive hydroshoring device. Thus, after flexing only a relatively small amount, the seal member 15a will contact the vertical side portions 13a of the bottom pressure plate 13 and further flexing thereof will cease. This small seal flexure which, in effect, provides a small damping volume uniquely built into the inventive hydroshoring system 10, assures the free flotation of the floating floor 11 while under load conditions. In addition, it allows or compensates for air bubbles and other compressible voids which may have developed in the fluid space of the pressure compartment or chamber 11. Finally, any cargo load placed on the floating floor 11 will still be able to fully flex the seal member 15a into the damping volume provided between it and vertical side portions 13a without actually contacting the bottom surface of the pressure plate 13.

In FIG. 3, a heavy-duty form of the inventive e hydroshoring system is indicated generally at 18 as including a bottom pressure plate at 19, which is identical to that previously described at the reference numeral 13 for the light-duty inventive form of FIG. 2. Again, said bottom pressure plate 19 may be formed, as by stamping, into a pan configuration having upright or vertical side portions, as seen at 19a, which side portions 19a extend to an overlapping relation with the floating floor member indicated generally at 20. The latter element may consist of an extruded member that may be substituted for the previously described floating structural floor 11 of the form of the present invention disclosed in FIG. 2. The extruded floating floor member 20 is used for heavier cargo loads and is likewise constructed as a structural member which includes cross bracing, as is illustrated at 21, for example. Again, clamp-seal means, similar to that disclosed at 15 in FIG. 2, is utilized at 22 to seal a hydraulic oil-filled compartment or chamber 23. The latter is likewise used to support the bottom surface 20a of said floor member 20 in freely floating relation thereon. Thus, as in the inventive form of FIG. 2, a cargo load placed on the top surface of the floating floor member 20 will create a pressure in the hydraulic oil contained within the compartment or chamber 23. This pressure is thereby evenly distributed throughout said chamber to act across the entire surface of the bottom pressure plate 19 with a force significantly reduced over that originally applied to the top surface of the member 20. The aforementioned clamp-seal means 22 includes the seal member 22a, which is clamped in sealing contact to appropriate portions of both floating floor member 20 and bottom pressure plate 19 by means of a pair of clamps at 24. The latter are, in turn, retained in their clamping position by means of suitable fasteners represented at the reference numerals 24a.

Figure 4:
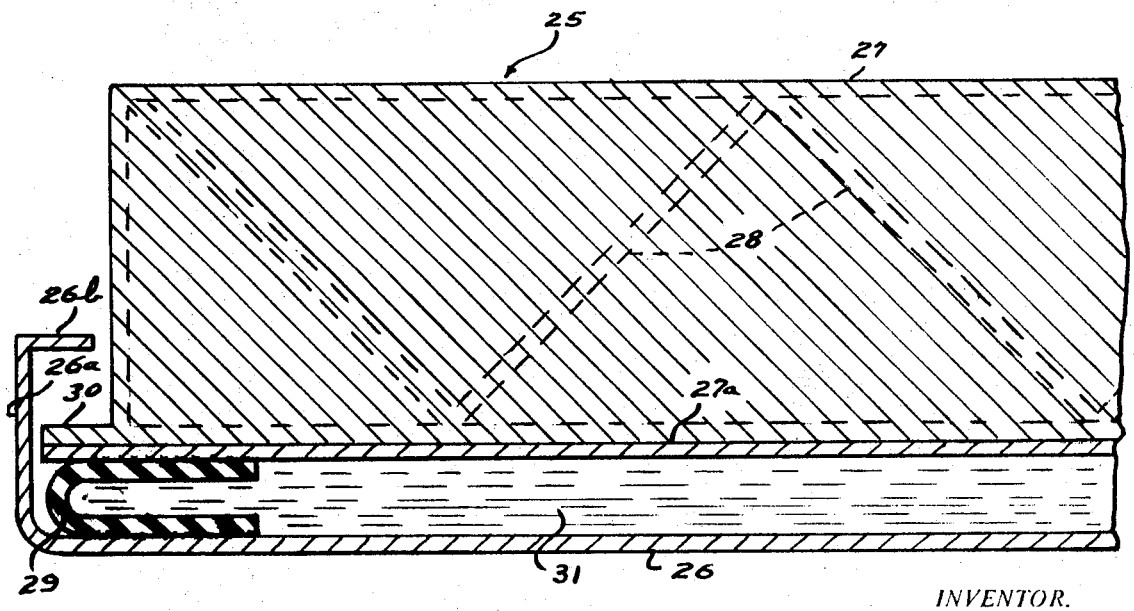
FIG. 4 is a third, cross-sectional view, partly broken away, of the heavy-duty type of hydroshoring of FIG. 3 shown further modified with an adhesive seal instead of the clamp seal of FIGS. 1 and 2.

FIG. 4 of the drawing illustrates a hydroshoring system at 25 which includes a bottom pressure plate at 26, and a floating floor member 27, again, consisting of an extruded member equipped with cross bracing at 28 and thereby of similar construction to the previously noted bottom pressure plate 19 and floating floor member 20 of FIG. 3. Although similarly constructed for heavy-duty operation, as in the inventive form of the aforementioned FIG. 3, hydroshoring system 25 is further modified to incorporate an adhesive seal means 29 in place of the clamp-seal means 15 or 22 of FIGS. 2 and 3, respectively. Thus, in the form of the invention disclosed in said FIG. 4, adhesive seal means 29 is utilized to seal the hydraulic oil-filled compartment or chamber 31 in a much more simplified manner than that previously described in FIGS. 2 and 3. To accommodate the installation of said seal means 29 thereto, both floating floor member 27 and bottom pressure plate 26 have been somewhat modified. Thus, said floating floor member 27 may be specifically designed with a circumferentially disposed, outwardly projecting edge surface at 30, which is made contiguous with the bottom surface portion 27a of the member 27. One surface of the adhesive seal means 29 may then be sealed to said bottom surface portion 27a substantially adjacent to said outwardly projecting edge surface 30. Bottom pressure plate 26 is also modified to incorporate vertical or upright edge portions, one of which is indicated at 26a, which is designed to overlap the outwardly projecting edge surface 30 of floating floor member 27. The latter terminates in a reversed end portion at 26b which overhangs the aforementioned outwardly projecting portion 30, as is clearly seen in the aforesaid FIG. 4. Once again, with this unique arrangement both lateral movement of the floating floor member 27 is prevented and the relatively small damping volume, previously described in connection with FIGS. 2 and 3, for the limited flexure of the adhesive seal means 28 is provided for.

With specific reference to FIG. 5, another form of the hydroshoring system of the invention is shown generally at 32 as being applied to, or incorporated with, another type of cargo pallet. In this case, the system 32 again includes a floating floor member at 33, which is identical to that indicated at 11 in FIG. 2. Said member 33 is illustrated as including an upper plate portion 33a, a lower plate portion 33b, and a plurality of supporting rib portions at 33c, shown interconnected therebetween. The latter may be integrally formed, as before, at their upper ends with the upper plate portion 33a, and at their lower ends they may be tack-welded, as shown, for example, at 33d, to the upper surface of the cargo pallet portion 36. The latter member 36 is substituted, in this form of the invention, for the bottom pressure plate 13 of FIG. 2, or 19 of FIG. 3. Again, a hydraulic oil-filled compartment or chamber 37 is formed between said floating floor member-lower plate 33b and said cargo pallet portion 36, and is sealed by means of the clamp-seal means at 34. The clamp-seal means 34 consists, as in the case of FIGS. 2 and 3, of the seal means 34a, and a plurality of clamps at 34a fastened in position by suitable fastening means at 34c. To complete the cargo pallet, an upright, vertical rail portion, depicted at 35, is integrally formed with the said cargo pallet portion 36. As seen in the aforesaid FIG. 5, rail portion 35 overlaps floating floor member 33 and, as such, performs the same function as in the case of the vertical side portions 13a, for example, of the inventive form of FIG. 2; namely, the prevention of lateral movement of said floor member 11 and, in addition, it is designed to provide for the limited flexing of the seal means 34a for the same reasons previously discussed.

A still further modified form of the invention is illustrated in FIG. 6. In the latter FIG., the inventive hydroshoring system is indicated generally at 38 as including an upper, floating floor plate member 38a, a bottom pressure plate 38b, and, as in the other described forms of the invention, a compartment or chamber at 39 that may be filled with hydraulic oil. Again, compartment or chamber 39 may be sealed, as by means of a rubber or neoprene one-piece sealing means indicated at 40. Opposite end portions of said sealing means 40 may be attached in sealing relation to said upper plate member 38a and said bottom pressure plate 38b, as shown, by the clamping means at 41, which may be held in position by any suitable fastener means, as is represented by the reference numerals at 42. An upright, vertically oriented, rail member, indicated at 43, may be attached to, or integrally formed with, said bottom pressure plate 38b to complete one type of cargo pallet to which the present invention may be easily applied.

The aforementioned floating floor plate member 38a and bottom pressure plate 38b, shown in the inventive form of FIG. 6, may be further modified to each incorporate a plurality of reinforcing and spaced-apart members which are oriented in opposed and alternately disposed relation to each other, as is illustrated at the reference numerals 44 and 45, respectively. As may be clearly seen in the aforesaid FIG. 6, the plurality of reinforcing members 44, which are disposed across the width and along the inside surface of said upper floating floor plate member 38a, are made with a shorter length than that of the previously noted plurality of reinforcing members 45, which are likewise disposed across the width of bottom pressure plate 38b. With this unique arrangement, and further because of the alternate disposition therebetween, any force resulting from a relatively dense cargo load placed on top of said floating plate member 38a will, as explained hereinbefore, form a pressure in the hydraulic oil of said compartment or chamber 39, which pressure will be evenly distributed throughout and thereby result in a considerably reduced force being applied across the bottom pressure plate 38a and to the floor of the aircraft in which mounted. Once again, the sealing means 40 is permitted to deflect a certain amount into a limited damping volume, and the relatively longer reinforcing members 45 integrally disposed along bottom pressure plate 38b will limit any further relative movement of said floating floor plate member 38b. Of course, as has been previously indicated, the spaced-apart members 44 and 45, respectively, provide additional reinforcement to both floating plate member 38a and bottom pressure plate 38b. In this connection, the bottom pressure plate 38b may be still further reinforced by means of a plurality of, preferably, 1-inch blocks 46 which may be alternately arranged, as shown, with the aforementioned upright reinforcing members 45 and disposed every running 6 inches across said bottom plate.

I claim:

1. In an aircraft cargo pallet; hydroshoring means for supporting and distributing the force of relatively heavy/dense cargo loads over a relatively wide area and thereby substantially reducing the force applied to the aircraft floor, said means comprising; a bottom, main base support member adapted for positioning in supporting relation on the aircraft floor; hydraulically activated, pressure-transmitting means filled with hydraulic fluid, and encompassing and supported by said bottom, main base support member; and an upper, cargo-supporting platform member resting on the top surface of, and entirely supported in freely floating relation on, the hydraulic fluid contained within said hydraulically activated, pressure-transmitting means to thereby form an evenly distributed pressure resulting from a cargo load emplaced on said upper floating platform member that is applied across the entire surface area of said base, support member with a significantly lowered force; said hydroshoring means including sealing means comprising a resilient seal adapted for application to both of said bottom, base and upper, cargo-supporting platform members; and means for clamping said resilient seal in its sealing position to thereby close and seal said hydraulic fluid within said hydraulically activated, pressure-transmitting means; said resilient seal comprising a one-piece compound of rubber, neoprene and the like having minimum stress in compression to thereby offer substantially no additional resistance to the inherent resistance in the application of said hydraulic fluid to a cargo load positioned on said upper, cargo-supporting platform member.

2. In an aircraft cargo pallet as in claim 1, wherein said bottom base support member includes upright side portions extending in outwardly and overlapping relation to, and thereby preventing lateral movement of, said upper, cargo-supporting platform member; and said resilient seal is clamped with a closed end portion thereof in slightly spaced relation to the said upright side portions of said bottom base support member to thereby provide for a minimum flexure of said seal during the application of a load to said upper, freely floating platform member.

3. In an aircraft cargo pallet as in claim 1, wherein said resilient seal further consists of an open-ended adhesive material adhered to both of said bottom and upper, floating platform members with a closed end portion thereof disposed in relatively small, spaced-apart relation to upright side portions formed on said bottom base support member to thereby provide for the limited flexure of said seal into a relatively small damping volume provided thereby between said seal and said bottom, base support member-upright side portions and thus preventing contact between said upper and bottom members.

4. In an aircraft cargo pallet as in claim 1, wherein said upper cargo-supporting platform member comprises a lower plate element in direct contact with, and immediately supported in freely floating relation on said hydraulic fluid; and an upper, extrusion element supported to, and further upwardly of, said lower plate element for directly supporting a relatively heavy/dense cargo load thereon.

5. In an aircraft cargo pallet as in claim 1, wherein said hydraulically activated, pressure-transmitting means comprises; a sealed chamber positioned over, and encompassing the base member and further being filled with the said hydraulic fluid; said bottom, base support member incorporating a plurality of relatively elongated spaced-apart reinforcing members extending vertically upward from the surface towards said upper, floating platform member, and said upper member similarly incorporating a plurality of relatively short, reinforcing members extending vertically downward towards, and arranged in alternately spaced relation to, said base support member to thereby simultaneously provide reinforcement to both of said members and to prevent said upper, cargo-supporting floating platform member from direct engagement with said bottom, base support member when placed under a load.